(No Model.)
S. WILSON, Jr.
ROPE HOOK.
No. 363,495.　　　　　　　　Patented May 24, 1887.
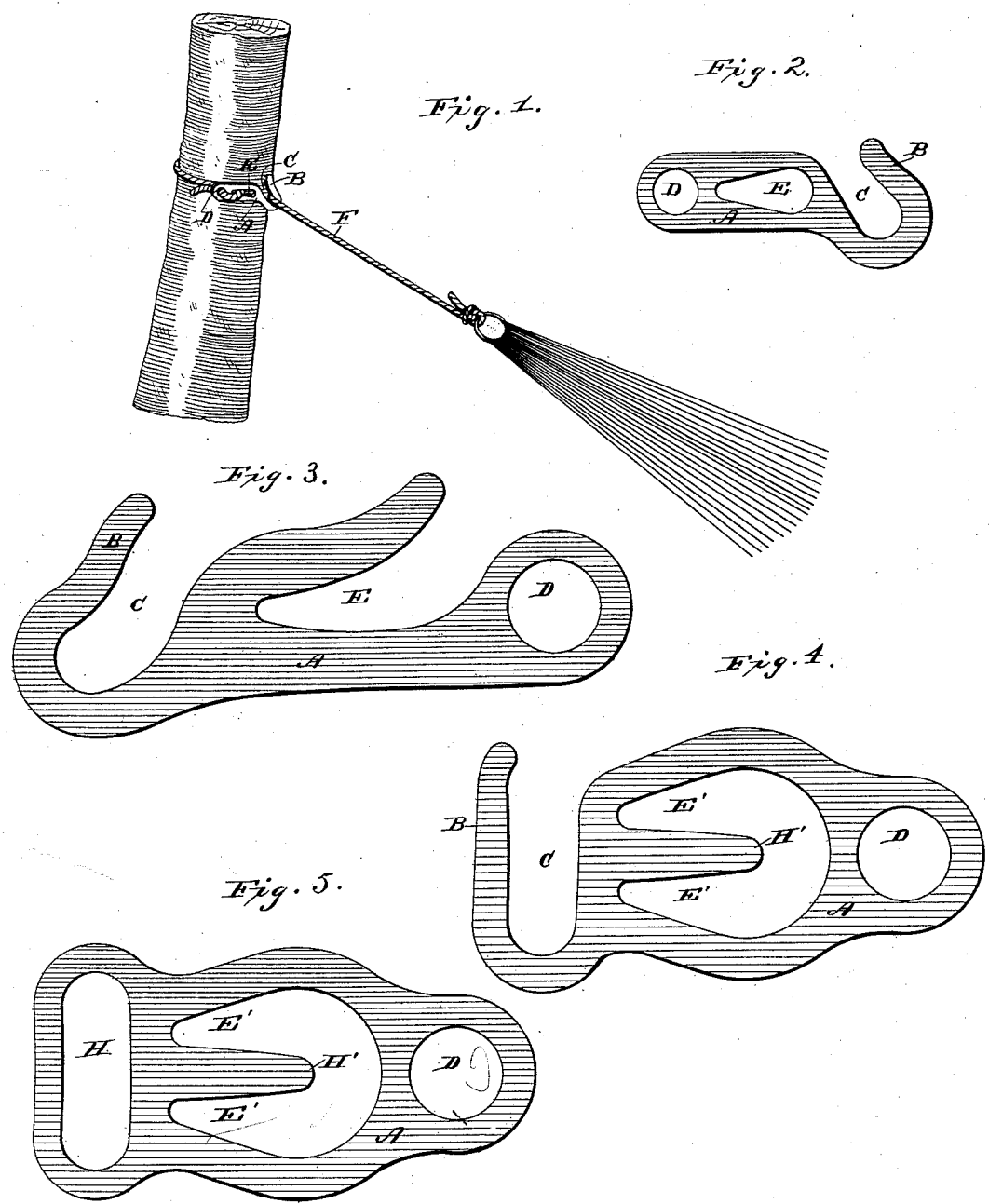
Witnesses.
Chas. R. Burt.
Thomas Durant.
Inventor.
Stephen Wilson Jr
by Church & Church
his Attorneys.

UNITED STATES PATENT OFFICE.

STEPHEN WILSON, JR., OF PHILADELPHIA, PENNSYLVANIA.

ROPE-HOOK.

SPECIFICATION forming part of Letters Patent No. 363,495, dated May 24, 1887.

Application filed September 22, 1886. Serial No. 214,261. (No model.)

*To all whom it may concern:*

Be it known that I, STEPHEN WILSON, Jr., of Philadelphia, county of Philadelphia, and State of Pennsylvania, have invented certain new and useful Improvements in Rope-Hooks; and I do hereby declare the following to be a full, clear, and exact description of the same, reference being had to the accompanying drawings, forming part of this specification, and to the figures and letters of reference marked thereon.

My invention relates to improvements in hooks or fastening devices to be attached to the ropes of hammocks and adapted to be connected to the main portion of the rope after it is passed around a tree or other support, said hook being readily adapted for attachment to the rope at any portion of its length, and also to be used on ropes or cables used for any other purposes, though particularly adapted for the purpose mentioned; and to these ends it consists in a certain improved construction of device, which I will now proceed to describe, and then to point out its novel features in the claims at the end of this specification.

In the drawings, Figure 1 is a perspective view showing the application of my invention. Fig. 2 shows the preferred form of hook. Figs. 3, 4, and 5 are views of modifications of the hook shown in Fig. 2.

Similar letters of reference in the several figures denote the same parts.

A represents my improved fastening-hook, consisting of a flat plate of metal, preferably malleable cast-iron galvanized, and formed with a hook portion, B, forming the open recess C, at one end, and near the other end with a perforation, D.

Near the middle of the plate, or between the hook and perforation, is provided an opening or perforation, E, preferably rounded at the end toward the hook, and with its sides converging toward the rear end, forming a tapering slot, as shown in Fig. 2.

As shown in Fig. 1, the hook is applied to the suspension-rope of a hammock, which is to be fastened to the limb of a tree or other support by passing the end of the rope F through the perforation E near the hook, then over the top of the plate and down through the perforation D. Then the end of the rope with the hook attached thereto is passed around the tree or other support, and the main portion of the rope F placed in the recess C and the rope drawn taut. The main portion of the rope, passing through the tapered perforation, is drawn toward the smaller end, and is tightly compressed therein and prevented from slipping, the pull on the rope drawing it toward the smaller end, and the end of the rope passing through the perforation beyond the perforation E forms a short bight at the narrow portion and insures the rope being kept therein. The rope can of course be adjusted by easing the strain on the rope, moving the rope toward the larger end of the slot, and adjusting it forward or backward, as desired, then giving it a jerk toward the tapered portion to secure it tightly in position again.

It is of course immaterial whether the open recess C be up or down, and in either event the rope will be held securely and the clamping device operate the same.

If desired, the end of the rope, when first applied, may be inserted through the round perforation at the end and then through the tapered or fastening slot; but such a connection I do not regard as good as the one just described.

In Fig. 3 I have shown a modified form of device, in which, instead of making the tapered recess or perforation closed, as in Fig. 1, I form it open on one side, so that the rope may be slipped in from the side instead of being threaded through the perforation, and also in this form the narrowed or locking end of the slot is toward the hook end.

In Fig. 4 is shown a form of device somewhat similar to that shown in Fig. 1, but differing, in that the locking-slot has two narrowed portions, E' E', formed by a central projection, H'; and when this form is employed the portion of the rope clamped may be above or below the center, as the rope is pulled up or down.

In Fig. 5 is shown the same general form of device as that shown in Fig. 4. Instead of a hook at the outer end to clasp the main portion of the rope, a perforation, H, is employed, through which the rope is threaded.

It will of course be obvious that various changes can be made in the hook without departing from the spirit of my invention, and I therefore do not desire to be confined to the exact construction of device shown. Nor is the use of the invention confined to hammock-ropes, but it can be equally well applied to analogous uses; but the facility with which the length of the rope can be adjusted and the rope fastened renders it especially advantageous for adjusting and fastening hammocks.

I am aware that devices have been used before to fasten ropes, consisting of plates or hooks having a tapering slot, in which some portion of the rope has been forced and clamped; but I do not desire to be understood as claiming, broadly, any such construction. In none of these devices is the tapered slot and the perforation so arranged as to co-operate in any manner to fasten the rope to the plate, but they act simply as guide-loops, while in my device the perforation co-operates with the tapered slot, no matter at which end of it it is located, to more securely fasten the rope.

I claim as my invention—

1. As an article of manufacture, a device for securing a bight of rope around a suitable support having the tapering slot in which the rope is clamped, a perforation adjacent to the clamping-slot, through which the rope is passed for holding it in engagement with the clamping-slot and flat upon the plate, and having at or near one end a hook or perforation, in which the main portion of the rope is placed after the end with the fastening device thereon has been placed around the support, as set forth.

2. As an article of manufacture, a hammock-hook consisting of a plate having a hook at one end, a tapered clamping-slot, and a perforation near said clamping-slot, through which the rope is passed for holding it flat upon the plate and in engagement with the clamping-slot, substantially as described.

3. As an article of manufacture, a hammock-hook consisting of a plate of metal having a hook or recess at one end, a tapered clamping-slot, and a perforation located near the smaller end of said clamping-slot, substantially as described.

STEPHEN WILSON, JR.

Witnesses:
   J. F. TURNER,
   F. M. OSTRANDER.